United States Patent
Chen et al.

(10) Patent No.: US 11,289,902 B2
(45) Date of Patent: Mar. 29, 2022

(54) COMPOSITE CIRCUIT PROTECTION DEVICE

(71) Applicant: FUZETEC TECHNOLOGY CO., LTD., New Taipei (TW)

(72) Inventors: Jack Jih-Sang Chen, New Taipei (TW); Chang-Hung Jiang, New Taipei (TW)

(73) Assignee: FUZETEC TECHNOLOGY CO., LTD., New Taipei (TW)

( * ) Notice: Subject to any disclaimer, the term of this patent is extended or adjusted under 35 U.S.C. 154(b) by 103 days.

(21) Appl. No.: 16/834,741

(22) Filed: Mar. 30, 2020

(65) Prior Publication Data
US 2021/0305807 A1    Sep. 30, 2021

(51) Int. Cl.
*H02H 9/02*    (2006.01)
*H01C 1/14*    (2006.01)
*H01C 7/12*    (2006.01)
*H01C 7/02*    (2006.01)

(52) U.S. Cl.
CPC .......... *H02H 9/026* (2013.01); *H01C 1/1406* (2013.01); *H01C 7/021* (2013.01); *H01C 7/12* (2013.01)

(58) Field of Classification Search
CPC ...... H02H 9/026; H01C 1/1406; H01C 7/021; H01C 7/12
USPC .......................................................... 361/119
See application file for complete search history.

(56) References Cited

U.S. PATENT DOCUMENTS

| 4,459,632 | A | * | 7/1984 | Nijman | H02H 9/042 |
| | | | | | 361/56 |
| 5,982,597 | A | * | 11/1999 | Webb | H01C 7/108 |
| | | | | | 361/103 |
| 8,508,328 | B1 | | 8/2013 | Chen et al. | |
| 2006/0215342 | A1 | * | 9/2006 | Montoya | H01C 1/148 |
| | | | | | 361/103 |

FOREIGN PATENT DOCUMENTS

CN    102522736 A  *  6/2012

OTHER PUBLICATIONS

Machine translation of Qi et al. Chinese Patent Document CN 102522736 A Jun. 27, 2012 (Year: 2012).*

* cited by examiner

*Primary Examiner* — Kevin J Comber
(74) *Attorney, Agent, or Firm* — Hamre, Schumann, Mueller & Larson, P.C.

(57) ABSTRACT

A composite circuit protection device includes first and second positive temperature coefficient (PTC) components, a voltage-dependent resistor, and first, second and third conductive leads. The first PTC component includes a first PTC layer, and first and second electrode layers respectively disposed on two opposite surfaces of the first PTC layer. The second PTC component includes a second PTC layer, and third and fourth electrode layers respectively disposed on the two opposite surfaces of the second PTC layer. The voltage-dependent resistor is connected to the second and third electrode layers. The first, second and third conductive leads are bonded to the first electrode layer, the voltage-dependent resistor, and the fourth electrode layer, respectively.

23 Claims, 8 Drawing Sheets

COMPOSITE CIRCUIT PROTECTION DEVICE

FIELD

The disclosure relates to a composite circuit protection device, and more particularly to a composite circuit protection device having a voltage-dependent resistor sandwiched between two positive temperature coefficient (PTC) components.

BACKGROUND

U.S. Pat. No. 8,508,328 B1 discloses an insertable polymer positive temperature coefficient (PPTC) over-current protection device that includes first and second electrodes 30, a solder material, conductive lead pins 50, 60 bonded to the first and second electrodes 30, respectively, and a PTC polymer matrix 20 laminated between the first and second electrodes 30 (see FIG. 1). The PTC polymer matrix 20 is formed with a hole 40 that has an effective volume to accommodate thermal expansion of the PTC polymer matrix 20 at increased temperature.

Electrical properties (e.g., operating current and high-voltage surge endurability) are important factors which affect the occurrence of power surge in the PPTC over-current protection device. For example, an increase in the thickness or the area of the PTC polymer matrix 20 allows the operating current of the PPTC over-current protection device to be increased, which might result in the PPTC over-current protection device becoming more vulnerable to power surge. On the other hand, a decrease in the thickness or the area of the PTC polymer matrix 20 allows the high-voltage endurability of the PPTC over-current protection device to be increased, which does not necessarily makes the PPTC over-current protection device less vulnerable to power surge.

Although a voltage-dependent resistor (VDR) could be combined with the PPTC over-current protection device to impart over-current and over-voltage protection to the resultant composite circuit protection device, the (VDR) might only withstand power surge for a short time period (such as 0.001 seconds). That is, if a time period of the power surge exceeds a cut-off time period, the (VDR) might be burned out or damaged due to over-current and over-voltage, causing permanent loss of function of the composite circuit protection device.

SUMMARY

Therefore, an object of the disclosure is to provide a composite circuit protection device that can alleviate at least one of the drawbacks of the prior art.

According to the disclosure, a composite circuit protection device includes a first positive temperature coefficient (PTC) component, a second PTC component, a voltage-dependent resistor, a first conductive lead, a second conductive lead, and a third conductive lead.

The first PTC component includes a first PTC layer having two opposite surfaces, and first and second electrode layers respectively disposed on the two opposite surfaces of the first PTC layer.

The second PTC component includes a second PTC layer having two opposite surfaces, and third and fourth electrode layers respectively disposed on the two opposite surfaces of the second PTC layer.

The voltage-dependent resistor is connected to the second electrode layer of the first PTC component and the third electrode layer of the second PTC component.

The first conductive lead is bonded to the first electrode layer of the first PTC component. The second conductive lead is bonded to the voltage-dependent resistor. The third conductive lead is bonded to the fourth electrode layer of the second PTC component.

BRIEF DESCRIPTION OF THE DRAWINGS

Other features and advantages of the present disclosure will become apparent in the following detailed description of the embodiment with reference to the accompanying drawing, of which.

DETAILED DESCRIPTION

Figure 1:
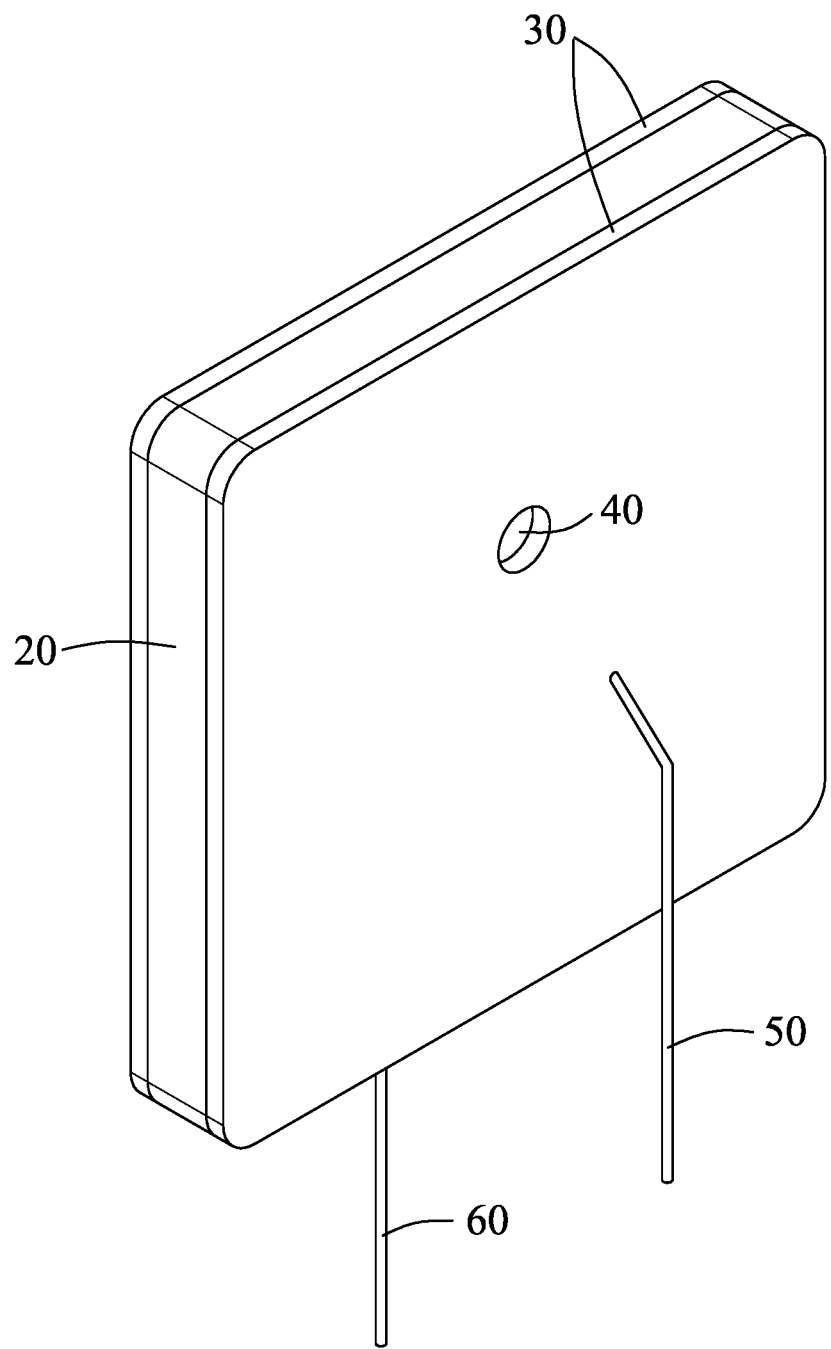
FIG. 1 is a perspective view of a conventional insertable PPTC over-current protection device.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
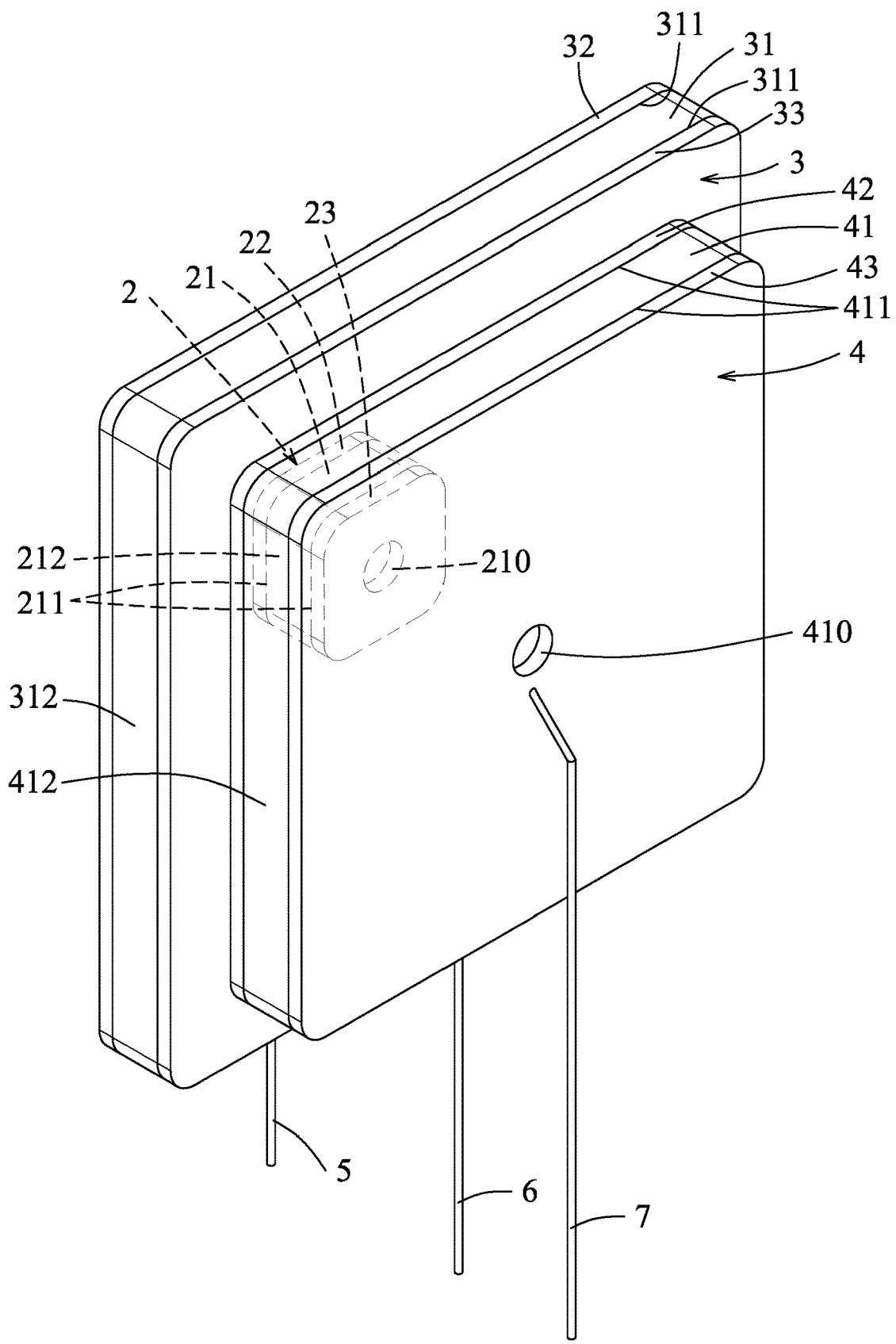
FIG. 2 is a perspective view of a first embodiment of a composite circuit protection device according to the present disclosure.
Figure 3:
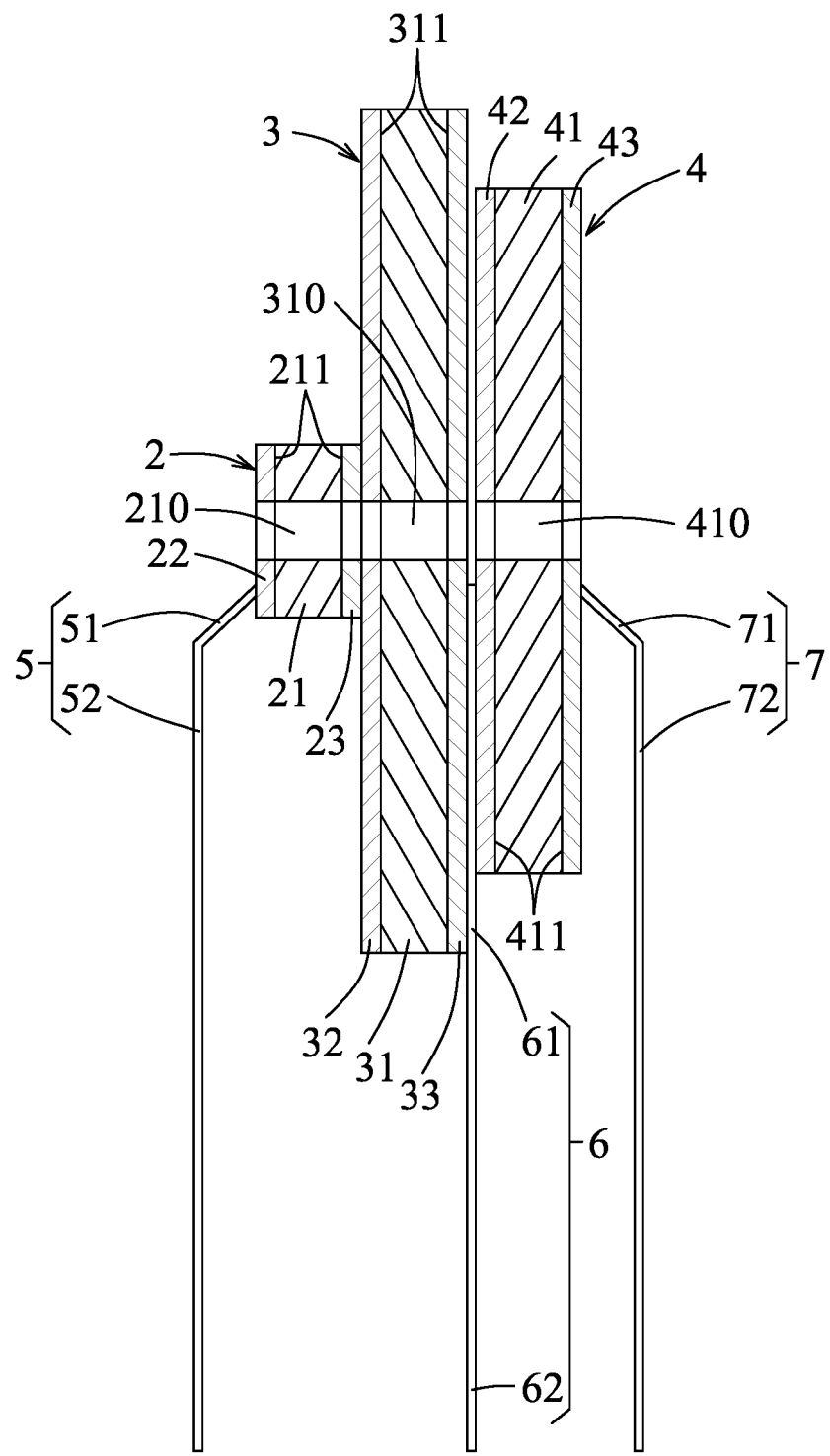
FIG. 3 is a schematic sectional view of the first embodiment.

Referring to FIGS. 2 and 3, a first embodiment of a composite circuit protection device according to the present disclosure includes a first positive temperature coefficient (PTC) component 2, a voltage-dependent resistor 3, a second PTC component 4, a first conductive lead 5, a second conductive lead 6, and a third conductive lead 7.

The first PTC component 2 includes a first PTC layer 21 having two opposite surfaces 211, and first and second electrode layers 22, 23 respectively disposed on the two opposite surfaces 211 of the first PTC layer 21.

The second PTC component 4 includes a second PTC layer 41 having two opposite surfaces 411, and third and fourth electrode layers 42, 43 respectively disposed on the two opposite surfaces 411 of the second PTC layer 41.

The voltage-dependent resistor 3 is connected to the second electrode layer 23 of the first PTC component 2 and the third electrode layer 42 of the second PTC component 4 through, solder materials.

The first conductive lead 5 is bonded to the first electrode layer 22 of the first PTC component 2. The second conductive lead 6 is bonded to the voltage-dependent resistor 3. The third conductive lead 7 is bonded to the fourth electrode layer 43 of the second PTC component 4.

In certain embodiments, the first PTC component 2 has a rated voltage that ranges between 40% and 200% of a varistor voltage of the voltage-dependent resistor 3, which is determined at 1 mA. In other embodiments, the first PTC component 2 has a rated voltage that is equal to or higher than 110% of the varistor voltage of the voltage-dependent resistor 3.

According to this disclosure, one of the first and second PTC component 2, 4 trips before the voltage-dependent resistor 3 burns out in the presence of an over-current and a voltage that is greater than the varistor voltage of the voltage-dependent resistor 3. In other words, when the over-current and the voltage that is greater than the rated voltage of the voltage-dependent resistor are present, one of the first and second PTC component 2, 4 quickly trips to a high resistance state, such that the over-current is restricted from flowing through the voltage-dependent resistor 3, thereby protecting the voltage-dependent resistor 3 from burning out. The composite circuit protection device can therefore be repeatedly used.

As used herein, the terms "burn out", "spark" and "fire" can be used interchangeably, and refer to the voltage-dependent resistor 3 being out of function, which typically occurred at a temperature of 180° C. or higher.

In certain embodiments, one of the first and second PTC components 2, 4 trips within 10 seconds to 10 seconds in the presence of an over-current and a voltage that is greater than the varistor voltage of the voltage-dependent resistor 3. In other embodiments, one of the first and second PTC components 2, 4 trips within $10^{-3}$ seconds to 10 seconds in the presence of an over-current that is greater than 0.5 A and a voltage that is greater than the varistor voltage of the voltage-dependent resistor 3. In yet other embodiments, one of the first and second PTC components 2, 4 trips within $10^{-3}$ seconds to 1 second in the presence of an over-current that is greater than 10 A and a voltage that is greater than the varistor voltage of the voltage-dependent resistor 3.

The first PTC component 2 may be formed with a first hole 210. In this embodiment, the first hole 210 is formed in the first PTC layer 21.

The first PTC layer 21 of the first PTC component 2 has a peripheral edge 212 that defines a boundary of the first PTC layer 21 and that interconnects the two opposite surfaces 211 of the first PTC layer 21. The first hole 210 is spaced apart from the peripheral edge 212, and has an effective volume to accommodate thermal expansion of the first PTC layer 21 at increased temperature, so as to avoid undesired structural deformation of the first PTC layer 21.

In certain embodiments, the first hole 210 extends through at least one of the two opposite surfaces 211 of the first PTC layer 21. In certain embodiments, the first hole 210 further extends through at least one of the first and second electrode layers 22, 23. In this embodiment, the first hole 210 extends through the two opposite surfaces 211 of the first PTC layer 21 and the first and second electrode layers 22, 23, so as to form a through hole.

In certain embodiments, the first hole 210 extends along a line passing through a geometrical center of the first PTC layer 21 and is transverse to the opposite surfaces 211 of the first PTC layer 21. The first hole 210 is defined by a first hole-defining wall having a cross section that may be parallel to the opposite surfaces 211 of the first PTC layer 21. The cross section of the first hole-defining wall may be in a shape of circle, square, oval, triangle, crisscross, or etc.

The second PTC component 4 may be formed with a second hole 410. In this embodiment, the second hole 410 is formed in the second PTC layer 41.

The second PTC layer 41 of the second PTC component 4 has a peripheral edge 412 that defines a boundary of the second PTC layer 41 and that interconnects the two opposite surfaces 411 of the second PTC layer 41. The second hole 410 is spaced apart from the peripheral edge 412, and has an effective volume to accommodate thermal expansion of the second PTC layer 41 at increased temperature, so as to avoid undesired structural deformation of the second PTC layer 41.

In certain embodiments, the second hole 410 extends through at least one of the two opposite surfaces 411 of the second PTC layer 41. In certain embodiments, the second hole 410 further extends through at least one of the third and fourth electrode layers 42, 43. In this embodiment, the second hole 410 extends through the two opposite surfaces 411 of the second PTC layer 41 and the third and fourth electrode layers 42, 43, so as to form a through hole.

In certain embodiments, the second hole 410 extends along a line passing through a geometrical center of the second PTC layer 41 and is transverse to the opposite surfaces 411 of the second PTC layer 41. The second hole 410 is defined by a second hole-defining wall having a cross section that may be parallel to the opposite surfaces 411 of the second PTC layer 41. The cross section of the second hole-defining wall may be in a shape of circle, square, oval, triangle, crisscross, or etc.

According to this disclosure, each of the first and second PTC components 2, 4 may be a polymer positive temperature coefficient (PPTC) component, and each of the first and second PTC layer 21, 41 may be a PTC polymeric layer that includes a polymer matrix and a conductive filler dispersed in the polymer matrix. The polymer matrix may be made from a polymer composition that contains a non-grafted olefin-based polymer. In certain embodiments, the non-grafted olefin-based polymer includes high density polyethylene (HDPE). In certain embodiments, the polymer composition of the polymer matrix further includes a grafted olefin-based polymer. In certain embodiments, the grafted olefin-based polymer includes a carboxylic acid anhydride-grafted olefin-based polymer. Examples of the conductive filler suitable for use in this disclosure include, but are not limited to, carbon black powder, metal powder, electrically conductive ceramic powder, and combinations thereof.

The voltage-dependent resistor 3 may include a voltage-dependent resistor layer 31 having two opposite surfaces 311, and fifth and sixth electrode layers 32, 33 respectively disposed on the two opposite surfaces 311 of the voltage-dependent resistor layer 31. The second conductive lead 6 may be bonded to one of the fifth and sixth electrode layers 32, 33 of the voltage-dependent resistor 3. In certain embodiments, the voltage- dependent resistor layer 31 is made of a metal-oxide material.

In this embodiment, the fifth electrode layer 32 is connected to the second electrode layer 23 of the first PTC component 2. The second conductive lead 6 is bonded to and disposed between the sixth electrode layer 33 of the voltage-dependent resistor 3 and the third layer 42 of the second PTC component 4.

The voltage-dependent resistor 3 may be formed with a third hole 310 in the voltage-dependent resistor layer 31. In this embodiment, the voltage-dependent resistor layer 31 of the voltage-dependent resistor 3 has a peripheral edge 312 that defines a boundary of the voltage-dependent resistor layer 31 and that interconnects the two opposite surfaces 311 of the voltage-dependent resistor layer 31. The third hole 310 is spaced apart from the peripheral edge 312 of the voltage-dependent resistor layer 31.

In certain embodiments, the third hole 310 extends through at least one of the two opposite surfaces 311 of the voltage-dependent resistor layer 31. In certain embodiments, the third hole 310 further extends through at least one of the fifth and sixth electrode layers 32, 33. In this embodiment, the third hole 310 extends through the two opposite surfaces 311 of the voltage-dependent resistor layer 31 and the fifth and sixth electrode layers 32, 33, so as to form a through hole.

The first conductive lead 5 may have a first connecting portion 51 and a first free portion 52, the second conductive lead 6 may have a second connecting portion 61 and a second free portion 62, and the third conductive lead 7 may have a third connecting portion 71 and a third free portion 72.

In this embodiment, the first connecting portion 51 of the first conductive lead 5 is bonded to an outer surface of the first electrode layer 22 of the first FTC component 2 through a solder material, and the first free portion 52 extends outwardly from the first connecting portion 51 beyond the first electrode layer 22 to be inserted into a pin hole in a circuit board or a circuit device (not shown in the figures).

The second connecting portion 61 of the second conductive lead 6 is bonded to and disposed between the the sixth and third electrode layers 33, 42 through a solder material, and the second free portion 62 extends outwardly from the second connecting portion 61 beyond the sixth and third electrode layers 33, 42 to be inserted into a pin hole in a circuit board or a circuit device (not shown in the figures).

The third connecting portion 71 of the third conductive lead 7 is bonded to an outer surface of the fourth electrode layer 43 of the second PTC component 4 through a solder material, and the third free portion 72 extends outwardly from the third connecting portion 71 beyond the fourth electrode layer 43 to be inserted into a pin hole in a circuit board or a circuit device (not shown in the figures).

Figure 4:
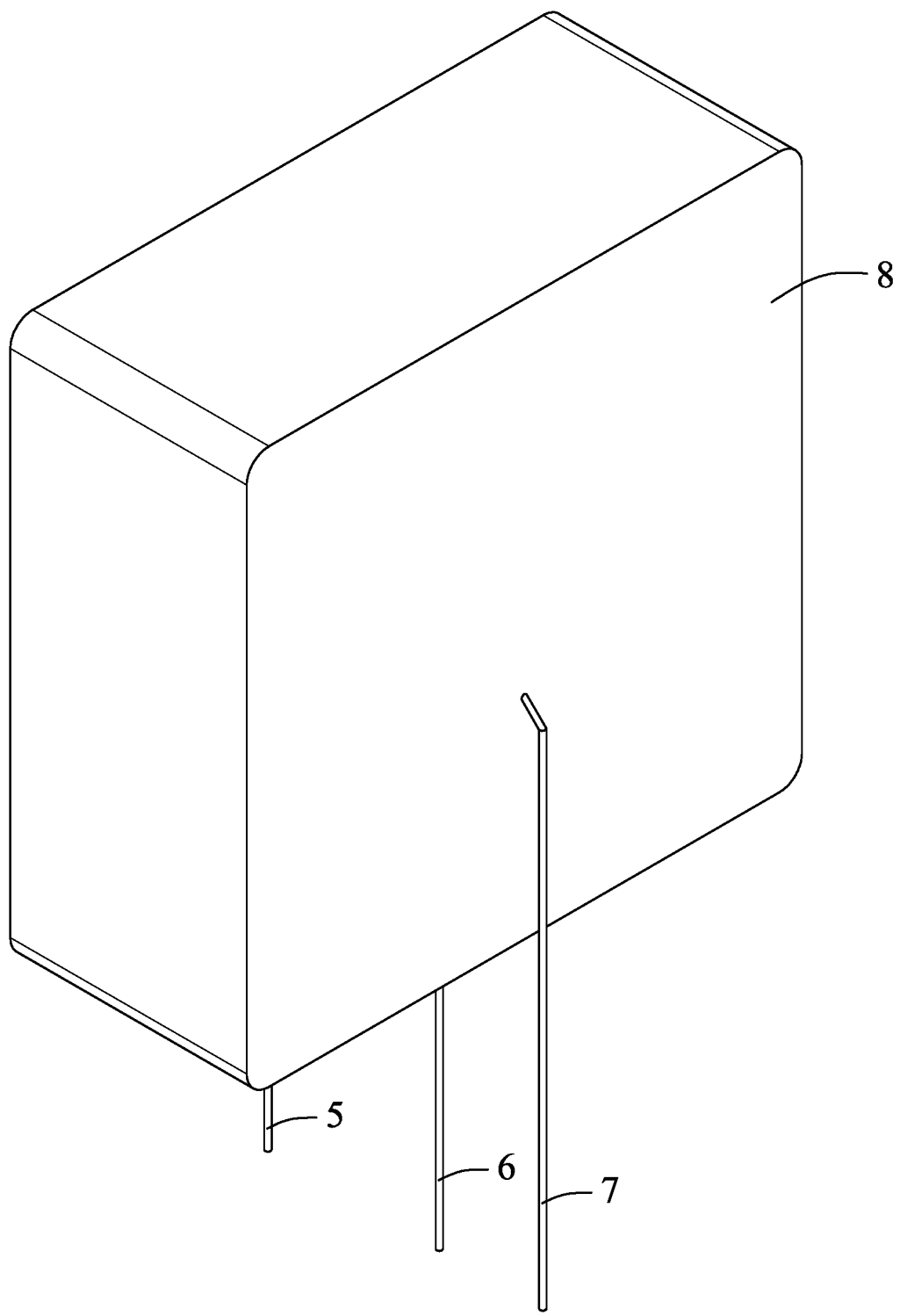
FIG. 4 is a perspective view of a second embodiment of the composite circuit protection device according to the present disclosure.
Figure 5:
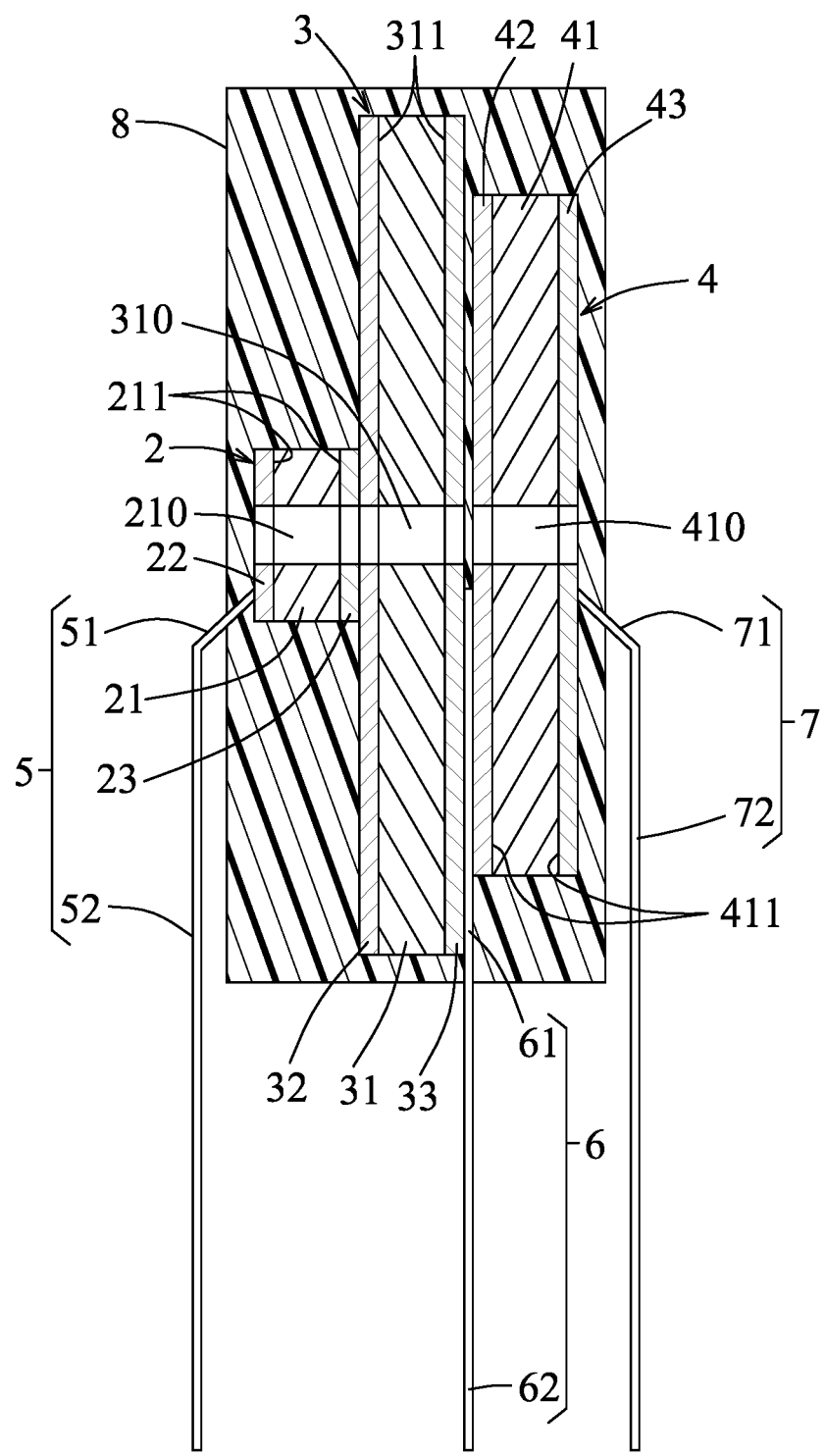
FIG. 5 is a schematic sectional view of the second embodiment.

Referring to FIGS. 4 and 5, a second embodiment of the composite circuit protection device according to the present disclosure is similar to the first embodiment, except that the second embodiment further includes an encapsulant 8 that encloses the first and second PTC component 2, 4, the voltage-dependent resistor 3, a part of the first conductive lead 5, a part of the second conductive lead 6, and a part of the third conductive lead 7. The first, second and third free portions 52, 62, 72 are exposed from the encapsulant 8. In certain embodiments, the encapsulant 8 is made from epoxy resin.

Figure 6:
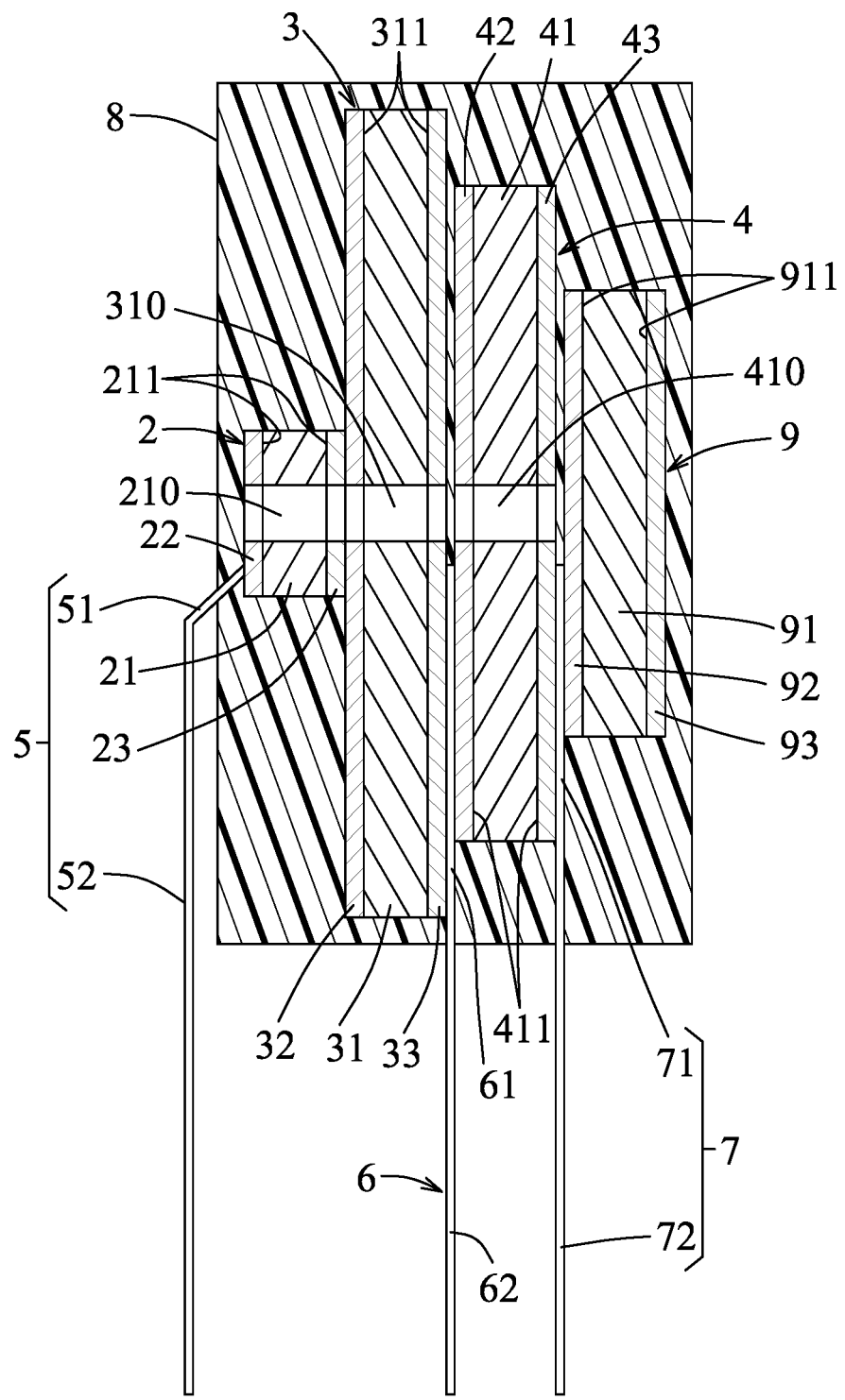
FIG. 6 is a schematic sectional view of a third embodiment of the composite circuit protection device according to the present disclosure.

Referring to FIG. 6, a third embodiment of the composite circuit protection device according to the present disclosure is similar to the second embodiment, except that the third embodiment further includes a third PTC component 9 (or a second voltage-dependent resistor 9) that is connected to the third conductive lead 7. The third PTC component 9 (or the second voltage-dependent resistor 9) includes a PTC layer 91 (or a voltage-dependent resistor layer) having two opposite surfaces 911, and seventh and eighth electrode layers 92, 93 respectively disposed on the two opposite surfaces 911. The third conductive lead 7 is bonded to and disposed between the fourth and seventh electrode layers 43, 92. The encapsulant 8 further encloses the third PTC component 9 (or the second voltage-dependent resistor 9). The third PTC component 9 (or the second voltage-dependent resistor 9) may be formed with a fourth hole (not shown in the figures).

Figure 7:
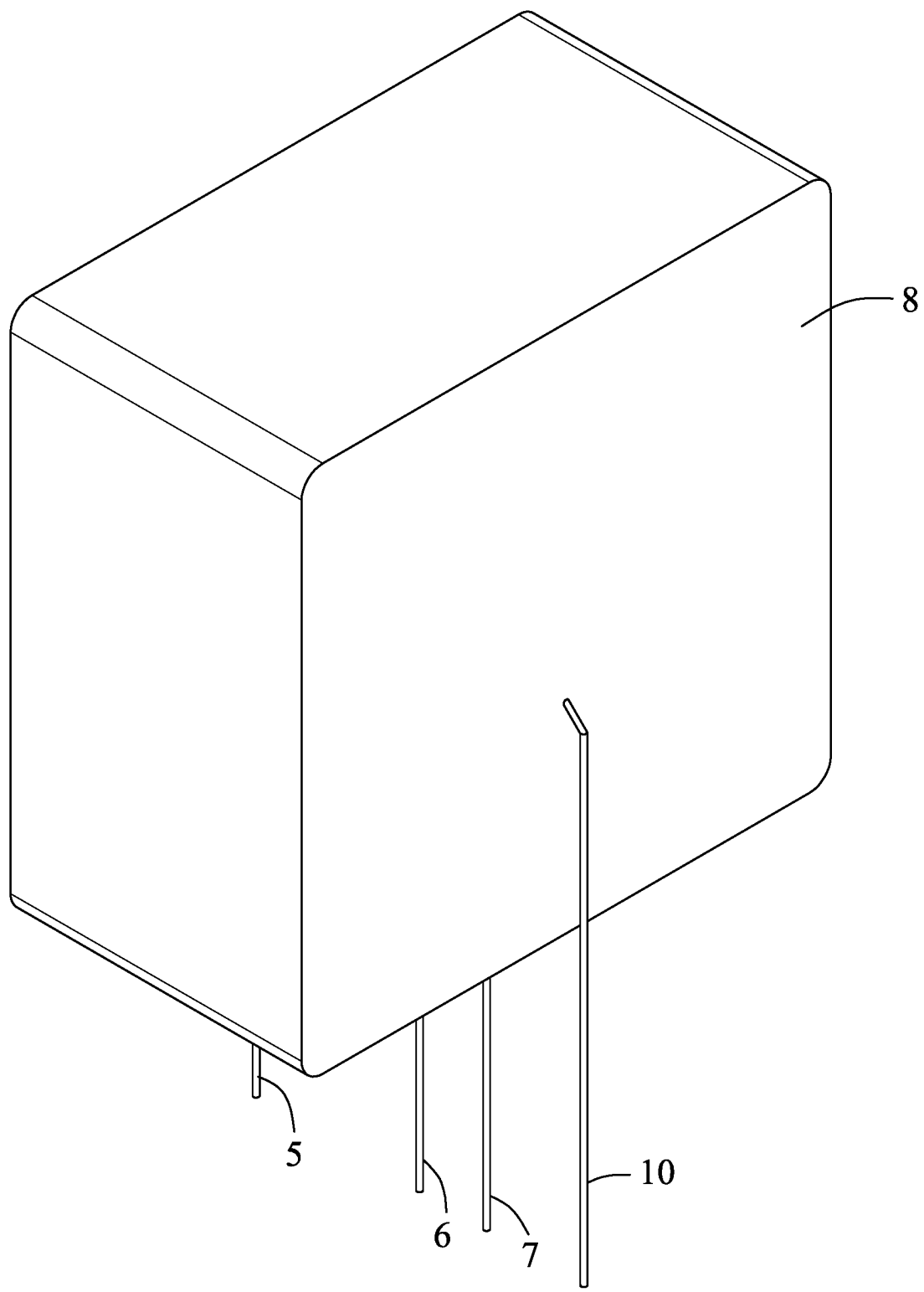
FIG. 7 is a perspective view of a fourth embodiment of the composite circuit protection device according to the present disclosure.
Figure 8:
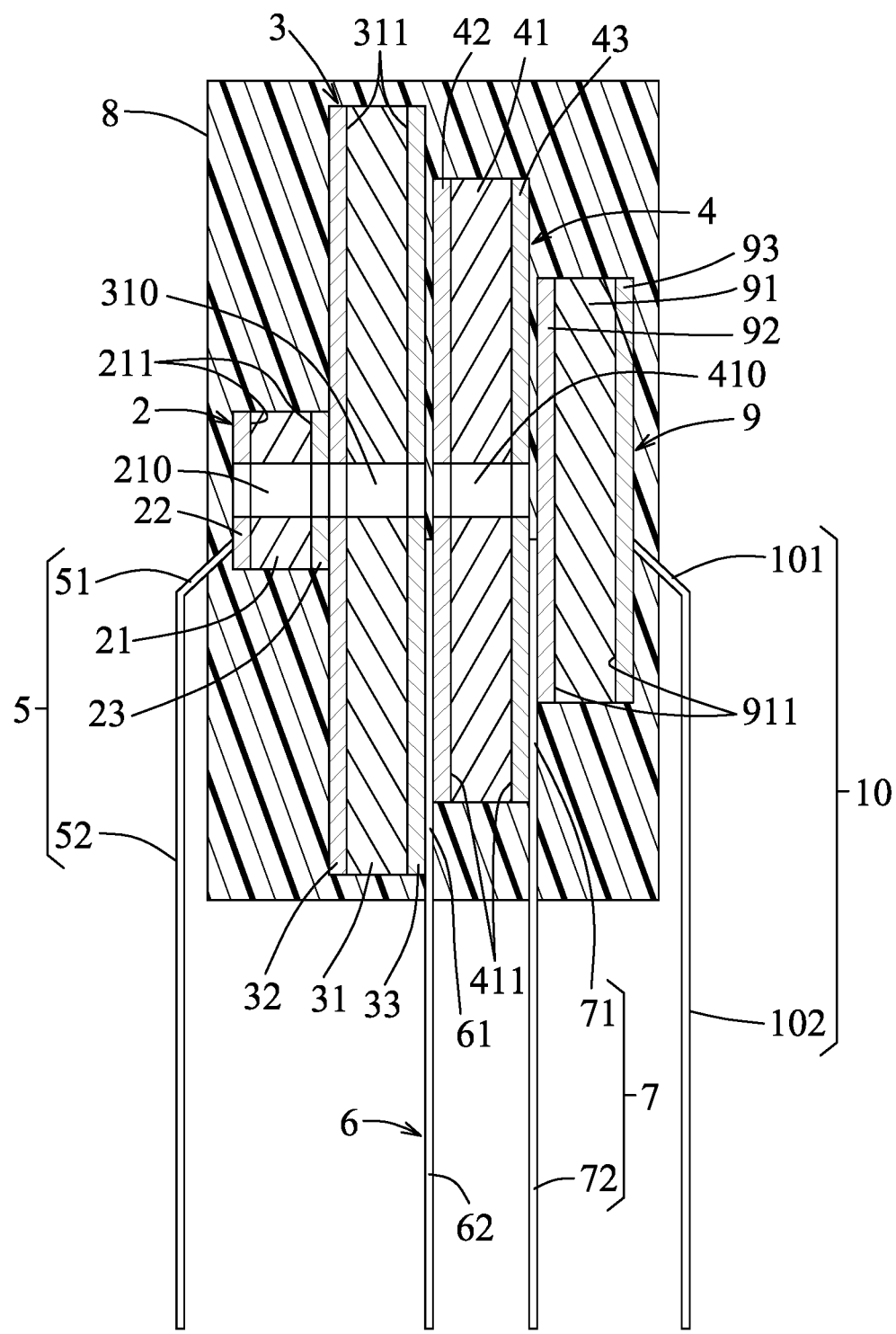
FIG. 8 is a schematic sectional view of the fourth embodiment.

Referring to FIGS. 7 and 8, a fourth embodiment of the composite circuit protection device according to the present disclosure is similar to the third embodiment, except that the third embodiment further includes a fourth conductive lead 10 that is bonded to the eighth electrode layer 93. The fourth conductive lead 10 has a fourth connecting portion 101 that is connected to an outer surface of the eighth electrode layer 93, and a fourth free portion 102 that extends outwardly from the fourth connecting portion 101 beyond the eighth electrode layer 93 to be inserted into a pin hole in a circuit board or a circuit device (not shown in the drawings). In addition, the encapsulant 8 encloses the first and second PTC component 2, 4, the voltage-dependent resistor 3, the third PTC component 9 (or the second voltage-dependent resistor 9), a part of the first conductive lead 5, a part of the second conductive lead 6, a part of the third conductive lead 7, and a part of the fourth conductive lead 10. The first, second, third and fourth free portions 52, 62, 72, 102 are exposed from the encapsulant 8.

The disclosure will be further described by way of the following examples and comparative examples. However, it should be understood that the following examples are solely intended for the purpose of illustration and should not be construed as limiting the disclosure in practice.

EXAMPLES

Example 1 (E1)

22 grams of HDPE (purchased from Formosa Plastics Corp., catalog no.: HDPE9002, and serving as the non-grafted olefin-based polymer), 22 grams of maleic anhydride grafted HDPE (purchased from Dupont, catalog no.: MB100D, and serving as the carboxylic acid anhydride-grafted olefin-based polymer) and 56 grams of carbon black powder (purchased from Columbian Chemicals Co., catalog no.: Raven 430UB, and serving as the conductive filler) were compounded in a Brabender mixer at 200° C. under 30 rpm for 10 minutes, so as to obtain a first compounded mixture. In addition, a second compounded mixture was prepared using 21 grams of HDPE, 21 grams of maleic anhydride grafted HDPE and 58 grams of carbon black powder under the same condition as described for the first compounded mixture.

Each of the first and second compounded mixtures was hot pressed in a mold under 200° C. and 80 kg/cm$^2$ for 4 minutes so as to form a thin sheet of a first PTC polymeric layer and a thin sheet of a second PTC polymeric layer, respectively. Two copper foil sheets (serving as a first/third electrode layer and a second/fourth electrode layer, respectively) were attached to the two opposite surfaces of each of the first and second PTC polymeric layers, and were hot pressed under 200° C. and 80 kg/cm for 4 minutes so as to form a first polymer positive temperature coefficient (PPTC) component and a second PPTC component, respectively. The first PPTC component was cut into a plurality of PPTC chips (PPTC-1) in a circular shape with a diameter of 6.4 mm and a thickness of 0.42 mm. The second PPTC component was cut into a plurality of PPTC chips (PPTC-2) with an area of 9.5 mm×11.5 mm and a thickness of 4.2 mm. Each of the PPTC-1 and PPTC-2 chips was irradiated with a Cobalt-60 gamma ray for a total irradiation dose of 150 kGy.

A metal-oxide varistor (MOV) (Manufacturer: Ceramate Technical Co., Ltd., Model No: 07D270K), i.e., a type of a voltage-dependent resistor, was then welded to one of the two copper foil sheets of each of PPTC-1 and PPTC-2 chips (i.e., sandwiched between the PPTC-1 and PPTC-2 chips), followed by welding of a first conductive lead to the other one of the two copper foil sheets of the PPTC-1 chip, welding of a second conductive lead to the MOV, and welding of a third conductive lead to the other one of the two copper foil sheets of the PPTC-2 chip, so as to form a composite circuit protection device of E1.

Each of the PPTC-1 and PPTC-2 chips was subjected to determination of a hold current (i.e., a maximum current value which can be applied in normal operation), a trip current (i.e., a minimum current value which is necessary for the PPTC component to achieve a high-resistance state), a rated voltage (i.e., a voltage at which the PPTC component is designed to work with) and a withstand voltage (i.e., a maximum voltage limit which will not cause the PPTC component to be malfunctioned or damaged) according to the Underwriter Laboratories UL 1434 Standard for Safety for Thermistor-Type Devices. In addition, the MOV was subjected to determination of a varistor voltage (i.e., a voltage at which the MOV component is designed to work with) and a clamping voltage (i.e., a maximum voltage that can pass the MOV component before it restricts further voltage from passing the test device) according to the Underwriter Laboratories UL 1449 Standard for Safety for Transient Voltage Surge Suppressors. The characteristic results are shown in Table 1.

TABLE 1

|  | Hold current | Trip current | Rated voltage | Withstand voltage |
|---|---|---|---|---|
| PPTC-1 | 0.90 A | 1.80 A | 30 V | 30 V |
| PPTC-2 | 5.00 A | 8.50 A | 16 V | 16 V |
|  |  |  | Varistor voltage$^a$ | Clamping voltage$^b$ |
| MOV | — | — | 27 V | 53 V |

—: Not applicable
a: determined at 1 mA
b: determined at a test pulse time (tp) of 8/20 μ s and a test pulse current (IP) of 2.5 A Examples 2 to 8 (E2 to E8)

The procedures and conditions in preparing the composite circuit protection devices of E2 to E8 were similar to those of E1, except that the PPTC-1 chip is formed with a first through hole, and/or the PPTC-2 chip is formed with a second through hole, and/or the MOV is formed with a third through hole (see Table 2). Each of the first, second and third through-holes is defined by a hole-defining wall with a circular cross section that has a diameter (d) of 1.5 mm and an area ($\pi d^2/4$) of 1.77 mm$^2$.

To be specific, in E2, after irradiating with the Cobalt-60 gamma ray, a central portion of the PPTC-1 chip was punched to form the first through hole. In E3, before welding to the PPTC-1 and PPTC-2 chips, a central portion of the MOV was punched to form the third through hole. In E4, a central portion of the PPTC-1 chip was punched to form the first through hole and a central portion of the MOV was punched to form the third through hole. In E5, after irradiating with the Cobalt-60 gamma ray, a central portion of the PPTC-2 chip was punched to form the second through hole. In E6, a central portion of the PPTC-1 chip and a central portion of the PPTC-2 chip were punched to form the first and second through holes, respectively. In E7, a central portion of the MOV and a central portion of the PPTC-2 chip were punched to form the third and second through holes, respectively. In E8, a central portion of the PPTC-1 chip, a central portion of the MOV and a central portion of the PPTC-2 chip were punched to form the first, third and second through holes, respectively.

Comparative Examples 1 to 2 (CE1 to CE2)

The procedures and conditions in preparing the composite circuit protection devices of CE1 and CE2 were respectively similar to those of E1 and E2, except that the MOV and PPTC-2 chip were not included in CE1 and CE2, and the first and second conductive leads were welded to the two copper foil sheets of the PPTC-1 chip.

Comparative Examples 3 to 4 (CE3 to CE4)

The procedures and conditions in preparing the composite circuit protection devices of CE3 and CE4 were respectively similar to those of E1 and E3, except that the PPTC-1 and PPTC-2 chips were not included in CE3 and CE4, and the first and second conductive leads were welded to two opposite surfaces of the MOV.

Comparative Examples 5 to 6 (CE5 to CE6)

The procedures and conditions in preparing the composite circuit protection devices of CE5 and CE6 were respectively similar to those of E1 and E5, except that the PPTC-1 chip and MOV were not included in CE5 and CE6, and the first and second conductive leads were welded to the two copper foil sheets of the PPTC-2 chip.

Comparative Examples 7 to 10 (CE7 to CE10)

The procedures and conditions preparing the composite circuit protection devices of CE7 to CE10 were respectively similar to those of E1, E5, E3 and E7, except that the PPTC-1 chip was not included in CE7 to CE10, and the first, second and third conductive leads were respectively welded to the two opposite surfaces of the MOV and one of the two copper foil sheets of the PPTC-2 chip opposite to the MOV.

For simplicity, the structure of the composite circuit protection devices of E1 to E8 and CE1 to CE10 are summarized in Table 2, where "V" is an indicator for existence.

TABLE 2

| | Composite circuit protection device | | | | |
|---|---|---|---|---|---|
| | PPTC-1 chip | First through hole | MOV | Third through hole | PTC-2 chip | Second through hole |
| E1 | V | | V | | V | |
| E2 | V | V | V | | V | |
| E3 | V | | V | V | V | |
| E4 | V | V | V | V | V | |
| E5 | V | | V | | V | V |
| E6 | V | V | V | | V | V |
| E7 | V | | V | V | V | V |
| E8 | V | V | V | V | V | V |
| CE1 | V | | | | | |
| CE2 | V | V | | | | |
| CE3 | | | V | | | |
| CE4 | | | V | V | | |
| CE5 | | | | | V | |
| CE6 | | | | | V | V |
| CE7 | | | V | | V | |
| CE8 | | | V | | V | V |
| CE9 | | | V | V | V | |
| CE10 | | | V | V | V | V |

Performance Test

Hold Current Test

Ten composite circuit protection devices of each of E1 to E8 and CE1 to CE10, serving as test devices, were subjected to a hold current test so as to determine the maximal hold current of the test devices. The hold current test was conducted at 25° C. and under 16 Vdc for 15 minutes without causing the test devices to trip. The results are shown in Table 3.

Time-to-Trip Test

The test devices of each of E1 to E8 and CE1 to CE10 were further subjected to time-to-trip test for determining the trip time of each test device. The trip time is defined as the time taken for each of the test device to trip at a selected trip current under a fixed voltage. The time-to-trip test was conducted under 16 Vdc and a trip current of 8.5 A at 25° C. The results are shown in Table 3.

TABLE 3

|  | Hold current test<br>Average maximal hold<br>current at 16 Vdc (A) | Time-to-trip test<br>Average trip time<br>at 16 Vdc/8.5 A (sec) |
|---|---|---|
| E1 | 6.0 | 24.400 |
| E2 | 6.1 | 24.210 |
| E3 | 6.1 | 23.950 |
| E4 | 6.3 | 23.900 |
| E5 | 6.3 | 23.750 |
| E6 | 6.4 | 23.700 |
| E7 | 6.3 | 23.500 |
| E8 | 6.5 | 23.220 |
| CE1 | 0.90 | 0.555 |
| CE2 | 0.95 | 0.540 |
| CE3 | — | — |
| CE4 | — | — |
| CE5 | 5.00 | 21.485 |
| CE6 | 5.40 | 20.530 |
| CE7 | 5.30 | 22.500 |
| CE8 | 5.70 | 21.265 |
| CE9 | 5.30 | 22.150 |
| CE10 | 5.70 | 21.125 |

—: Not applicable

As shown in Table 3, the test devices of E1 to E8 have an average maximal hold current at 16 Vdc ranging from 6.0 A to 6.5 A, which is higher than those of CE1 to CE2 and CE5 to CE10.

Surge Immunity Test

Ten test devices of each of E1 to E8 and CE1 to CE10 were subjected to a surge immunity test.

The surge immunity test for each test device was conducted under a fixed voltage (38 Vdc and 44 Vdc) and a fixed current (0.5 A and 10 A) via the first and second conductive leads, by switching on for 60 seconds and then off. If all of the PPTC chips) and the MOV were not burned out and damaged, the test device was determined to pass the surge immunity test, and the time at which the PPTC chip (s) of the test device tripped (i.e., trip time), if any, was recorded. If one of the PPTC chip (s) and the MOV was burned out, the test device was determined as burned out, and the time at which the PPTC chip (s) or the MOV was burned out (i.e., burned out time) was recorded. The results are shown in Table 4.

TABLE 4

|  | 38 V/0.5 A | | 38 V/10 A | | 44 V/0.5 A | | 44 V/10 A | |
|---|---|---|---|---|---|---|---|---|
|  | Result | Time (s) | Result | Time (s) | Result | Time (s) | Result | Time (s) |
| E1 | Passed | 1.400 | Passed | 0.455 | Passed | 1.365 | Passed | 0.155 |
| E2 | Passed | 1.375 | Passed | 0.450 | Passed | 1.285 | Passed | 0.150 |
| E3 | Passed | 1.250 | Passed | 0.440 | Passed | 1.210 | Passed | 0.140 |
| E4 | Passed | 1.205 | Passed | 0.435 | Passed | 1.170 | Passed | 0.135 |
| E5 | Passed | 1.385 | Passed | 0.430 | Passed | 1.295 | Passed | 0.140 |
| E6 | Passed | 1.350 | Passed | 0.420 | Passed | 1.250 | Passed | 0.125 |
| E7 | Passed | 1.245 | Passed | 0.405 | Passed | 1.190 | Passed | 0.115 |
| E8 | Passed | 1.200 | Passed | 0.395 | Passed | 1.155 | Passed | 0.100 |
| CE1 | Passed | No trip | PPTC-1 burned | 0.425 | Passed | No trip | PPTC-1 burned | 0.415 |
| CE2 | Passed | No trip | PPTC-1 burned | 0.410 | Passed | No trip | PPTC-1 burned | 0.410 |
| CE3 | MOV burned | 4.700 | MOV burned | 2.260 | MOV burned | 4.310 | MOV burned | 1.030 |
| CE4 | MOV burned | 4.435 | MOV burned | 2.050 | MOV burned | 3.885 | MOV burned | 1.015 |
| CE5 | Passed | No trip | PPTC-2 burned | 0.920 | Passed | No trip | PPTC-2 burned | 0.920 |
| CE6 | Passed | No trip | PPTC-2 burned | 0.915 | Passed | No trip | PPTC-2 burned | 0.910 |
| CE7 | MOV burned | 4.850 | MOV burned | 2.500 | MOV burned | 4.445 | MOV burned | 1.115 |
| CE8 | MOV burned | 4.450 | MOV burned | 2.450 | MOV burned | 4.405 | MOV burned | 1.095 |
| CE9 | MOV burned | 4.350 | MOV burned | 2.450 | MOV burned | 4.105 | MOV burned | 1.080 |
| CE10 | MOV burned | 4.340 | MOV burned | 2.250 | MOV burned | 4.035 | MOV burned | 1.055 |

Note:
For test device with result that is shown as passed, the time recorded refers to the time period for the PPTC chip to be tripped.
For test device with result that is shown as MOV burned, the time recorded refers to the time period for the MOV to be burned out.
For test device with result that is shown as PPTC burned, the time recorded refers to the time period for the PPTC chip to be burned out.

As shown in Table 4, the test devices of CE3 to CE4 containing only the MOV were burned out under the over-current of 0.5 A and the over-voltage that is at least 1.4 times greater than the varistor voltage (i.e., 27 V) of the MOV (the MOV can generally withstand a voltage that is 1.2 times greater than the varistor voltage thereof), or burned out within 2.5 seconds under the over-current of 10 A and the over-voltage, and such damage cannot be repaired. In addition, the test devices of CE1 to CE2 and CE5 to CE6 containing only the PPTC (PPTC-1 or PPTC-2) were burned out under the over-current of 10 A. The test devices of CE7 to CE10 containing the MOV and the PPTC-2 were also burned out under the over-voltage.

In contrast, all of the test devices of E1 to E8 containing the combination of the PPTC-1 chip, the MOV and the PPTC-2 chip (where the rated voltage of the PPTC-1 is about 111% of the varistor voltage of the MOV as determined at 1 mA) passed the surge immunity test without being burned out. Moreover, as compared to E1, formation of the hole in the PPTC chips and/or the MOV in the test devices of E2 to E8 improves the heat transfer, which may further shorten the time period for the PPTC chips to be tripped, and thus prevents the over-current from flowing through the MOV, thereby protecting the MOV of the test devices from being burned out. In other words, in the test devices of E1 to E8, the PPTC chips trip before the MOV burns out in the presence of an over-current and a voltage that is greater than the varistor voltage of the MOV.

In conclusion, since PTC components might quickly trip to a high-resistance state in the presence an over-current and an over-voltage, bonding the voltage-dependent resistor to two PTC components can effectively protect the voltage-dependent resistor from being burned out by the over-current, and thus the composite circuit protection device of this disclosure may be repeatedly used without being damaged, which demonstrates its excellent endurability and reliability.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure. While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A composite circuit protection device, comprising:
   a first positive temperature coefficient (PTC) component that includes a first PTC layer having two opposite surfaces, and first and second electrode layers respectively disposed on said two opposite surfaces of said first PTC layer;
   a second PTC component that includes a second PTC layer having two opposite surfaces, and third and fourth electrode layers respectively disposed on said two opposite surfaces of said second PTC layer;
   a voltage-dependent resistor that is connected to said second electrode layer of said first PTC component and said third electrode layer of said second PTC component;
   a first conductive lead that is bonded to said first electrode layer of said first PTC component;
   a second conductive lead that is bonded to said voltage-dependent resistor;
   a third conductive lead that is bonded to said fourth electrode layer of said second PTC component; and
   a third PTC component that is connected to said third conductive lead.

2. The composite circuit protection device of claim 1, wherein said first PTC component has a rated voltage that ranges between 40% and 200% of a varistor voltage of said voltage-dependent resistor.

3. The composite circuit protection device of claim 2, wherein said first PTC component has a rated voltage that is equal to or higher than 110% of the varistor voltage of said voltage-dependent resistor.

4. The composite circuit protection device of claim 1, wherein one of said first and second PTC components trips before said voltage-dependent resistor burns out in the presence of an over-current and a voltage that is greater than the varistor voltage of said voltage-dependent resistor.

5. The composite circuit protection device of claim 1, wherein one of said first and second PTC components trips within 10-5 seconds to 10 seconds in the presence of an over-current and a voltage that is greater than the varistor voltage of said voltage-dependent resistor.

6. The composite circuit protection device of claim 1, wherein one of said first and second PTC components trips within 10-3 seconds to 10 seconds in the presence of an over-current that is greater than 0.5 A and a voltage that is greater than the varistor voltage of said voltage-dependent resistor.

7. The composite circuit protection device of claim 1, wherein one of said first and second PTC components trips within 10-3 seconds to 1 second in the presence of an over-current that is greater than 10 A and a voltage that is greater than the varistor voltage of said voltage-dependent resistor.

8. The composite circuit protection device of claim 1, wherein said first PTC component is formed with a first hole that is formed in said first PTC layer.

9. The composite circuit protection device of claim 8, wherein said first PTC layer of said first PTC component has a peripheral edge defining a boundary of said first PTC layer and interconnecting said two opposite surfaces of said first PTC layer, said first hole being spaced apart from said peripheral edge of said first PTC layer.

10. The composite circuit protection device of claim 8, wherein said first hole extends through at least one of said two opposite surfaces of said first PTC layer.

11. The composite circuit protection device of claim 10, wherein said first hole further extends through at least one of the first and second electrode layers.

12. The composite circuit protection device of claim 8, wherein said second PTC component is formed with a second hole that is formed in said second PTC layer.

13. The composite circuit protection device of claim 12, wherein said second PTC layer of said second PTC component has a peripheral edge defining a boundary of said second PTC layer and interconnecting said two opposite surfaces of said second PTC layer, said second hole being spaced apart from said peripheral edge of said second PTC layer.

14. The composite circuit protection device of claim 12, wherein said second hole extends through at least one of said two opposite surfaces of said second PTC layer.

15. The composite circuit protection device of claim 14, wherein said second hole further extends through at least one of the third and fourth electrode layers.

16. The composite circuit protection device of claim 1, wherein said voltage-dependent resistor includes
   a voltage-dependent resistor layer having two opposite surfaces, and
   a fifth electrode layer disposed on one of said two opposite surfaces of said voltage-dependent resistor layer and connected to said second electrode layer of said first PTC component, and
   a sixth electrode layer disposed on the other one of said two opposite surfaces of said voltage-dependent resistor layer,
   wherein said second conductive lead is bonded to one of said fifth and sixth electrode layers of said voltage-dependent resistor.

17. The composite circuit protection device of claim 16, wherein said voltage-dependent resistor is formed with a third hole that is formed in the voltage-dependent resistor layer.

18. The composite circuit protection device of claim 17, wherein said voltage-dependent resistor layer of said voltage-dependent resistor has a peripheral edge defining a boundary of said voltage-dependent resistor layer and interconnecting said two opposite surfaces of said voltage-dependent resistor layer, said third hole being spaced apart from said peripheral edge of said voltage-dependent resistor layer.

19. The composite circuit protection device of claim 18, wherein said third hole extends through at least one of said two opposite surfaces of said voltage-dependent resistor layer.

20. The composite circuit protection device of claim 19, wherein said third hole further extends through at least one of said fifth and sixth electrode layers.

21. The composite circuit protection device of claim 1, wherein each of said first and second PTC components is a polymer positive temperature coefficient (PPTC) component, and each of said first and second PTC layers is a PTC polymeric layer.

22. The composite circuit protection device of claim 1, further comprising an encapsulant enclosing said first PTC component, said voltage-dependent resistor, said second PTC component, said third PTC component, a part of said first conductive lead, a part of said second conductive lead, and a part of said third conductive lead.

23. The composite circuit protection device of claim 1, further comprising a fourth conductive lead that is bonded to said third PTC component at a surface opposite to said third conductive lead.

* * * * *